United States Patent [19]
Deckler

[11] 3,888,387
[45] June 10, 1975

[54] METERING APPARATUS FOR A SEED PLANTER

[75] Inventor: Harry C. Deckler, South Bend, Ind.

[73] Assignee: White Farm Equipment Company, Cleveland, Ohio

[22] Filed: Oct. 12, 1973

[21] Appl. No.: 405,934

[52] U.S. Cl. ............................................. 221/278
[51] Int. Cl. ............................................ B65g 29/00
[58] Field of Search .......... 221/278, 254, 263, 266, 221/167, 169, 211, 265, 233, 237; 111/77, 78; 222/194, 177

[56] References Cited
UNITED STATES PATENTS
3,731,842  5/1973  Schlegel ............................ 221/278
FOREIGN PATENTS OR APPLICATIONS
75,585  3/1953  Denmark ............................ 221/263

Primary Examiner—Stanley H. Tollberg

[57] ABSTRACT

A seed metering apparatus in a seed planter of the type having a seed storage hopper and a drop chute for depositing seeds from the hopper in an underlying furrow comprises a rotatably driven disc having a plurality of seed receiving pockets about its periphery. As the planter is pulled forward the disc rotates and each pocket is caused to pass through a pressurized chamber wherein a predetermined number of seeds are picked up, and is then caused to pass through a compartment of reduced pressure wherein the seeds are released and fall into the drop chute. A passageway associated with each pocket provides a pressure differential which holds the seeds in the pockets as the pockets pass through the pressurized chamber, and a pressure gate is provided between the pressurized chamber and the compartment to control the pressure reduction in the compartment and to eliminate excess seeds in the pockets. Individual metering discs having pockets sized and shaped according to the type of seed being planted are provided and may be readily installed by the user according to his planting requirements.

23 Claims, 17 Drawing Figures

METERING APPARATUS FOR A SEED PLANTER

BACKGROUND OF THE INVENTION

This invention is directed to seed planters, and more particularly to a seed metering apparatus for seed planters wherein seeds may be deposited from a gravity-feed hopper into an underlying furrow with improved accuracy and speed.

Accuracy of seed placement is necesssary if maximum productivity is to be realized from planted crop land. If seeds are planted with too great a spacing or if a selected spacing is not maintained optimum yield will not be realized from the planted acreage. Conversely, if seeds are planted too close together the plants will crowd one another and will not attain maximum growth. Another important advantage of uniform seed placement is that the resulting plants are uniformly spaced and therefore can be harvested and cultivated much more readily.

In addition to providing uniform seed placement, it is desirable in modern high-production farming that a seed planter be capable of being set up to plant a variety of different crops with a minimum amount of mechanical adjustments, and once set up perform the planting operation at the highest possible speed. Various types of planters have been developed toward these ends with varying degrees of success. Mechanical planters, wherein the dispensing of seeds is metered by means of a rotary wheel or pivoted arm, often are not able to operate with the desired degree of precision at high planting speeds, thus slowing down production and adding to the cost of the crop. Attempts at operating mechanical planters at increased speeds have resulted in intermittent skipping of intended seed drop locations and of the seeds being rolled, twisted, or otherwise not optimally positioned as they are deposited in a furrow.

More recent attempts at speeding up the planting operation have utilized a vacuum source to hold one or more of the seeds against a perforated carrier member which transports them from a hopper to a drop chute, wherein they are deposited in the underlying furrow. While providing improved speed, such vacuum metering systems have been heretofore relatively complicated, costly, and difficult to adjust to accommodate various types of seeds. Another requirement of high-speed seed planters is that the seeds be gently handled since certain seeds, such as peanuts, are very fragile and are easily broken if subjected to excessive force or pressure. This requirement has been difficult to meet with the seed metering apparatus employed in many prior art planters.

Accordingly, it is a general object of the present invention to provide new and improved apparatus for metering seed flow between the hopper and the drill of a seed planter.

It is another object of the present invention to provide a new and improved metering apparatus for a seed planter which deposits seeds with improved accuracy and speed.

Another object of the present invention is to provide a new and improved metering apparatus for a seed planter which may be more conveniently converted to seeds of various sizes and shapes.

Another object of the present invention is to provide a new and improved metering apparatus for a seed planter the operation of which can be visually verified by an operator.

Another object of the present invention is to provide a new and improved metering apparatus for a seed planter which is capable of operating at high speed without subjecting delicate seeds to excessive force or pressure.

Another object of the present invention is to provide a new and improved seed metering disc of the type having pockets for receiving seeds for controlling the flow of seeds from a gravity-feed hopper to an underlying furrow.

Another object of the present invention is to provide a seed metering disc wherein the circumferential margins of the disc when installed on its housing resiliently bear against the margins of the underlying opening in the housing to provide an improved pressure seal notwithstanding dimensional tolerances in the disc and housing.

Another object of the present invention is to provide a seed metering disc having seed-receiving pockets disposed about its periphery shaped to accept a predetermined number of seeds per pocket.

Another object of the present invention is to provide a seed metering apparatus wherein air flow is directed to a seed-receiving chamber so as to aid in maintaining a constant level of seed in the chamber.

Another object of the present invention is to provide a seed planter wherein air is supplied from individual electrically driven blowers.

Another object of the present invention is to provide a seed metering apparatus wherein the air source is close to the seed metering disc so as to reduce energy requirements.

Another object of the present invention is to provide a seed metering apparatus operable from pressurized air wherein the air currents in the seed delivery tube are controlled.

Another object of the present invention is to provide a seed planter wherein the operator may shut off seed delivery in selected ones of individual planter units.

Another object of the present invention is to provide a seed metering disc molded of transparent plastic allowing the operator to verify operation visually.

Another object of the present invention is to provide new and improved seed metering discs which are readily interchanged on the seed planter and may be constructed with pockets of predetermined sizes and shapes to accommodate various types of seeds.

Another object of the present invention is to provide a new and improved seed metering apparatus of the type having a rotatable metering member wherein air pressure is utilized to reduce wear of the metering member, retain seeds in the metering member, and clean the seeds and metering member.

SUMMARY OF THE INVENTION

The invention is directed, in a seed planter for depositing seeds from a hopper into an underlying furrow at regular intervals, to a seed metering apparatus comprising a housing defining a chamber having an opening with margins lying in a single plane, means comprising a drop chute for discharging seeds into the furrow, and gravity feed means for conveying seeds from the hopper to the chamber. A seed metering member overlying the opening and having a plurality of pockets for receiving a predetermined number of the seeds is provided, the metering member being rotatably mounted so as to bring each of the pockets sequentially in communication with the chamber and the drop chute. Means are provided for supplying pressurized air to the chamber to urge the seeds into the pockets, and means for at least substantially isolating the pockets from the pressurized air while the pockets are in communication with the drop chute are provided to allow the seeds in the pockets to fall into the drop chute. Means for rotating the metering member as the seed planter moves along the furrow are further provided to cause the seeds from the hopper to be regularly deposited in the furrow.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like referennce numerals identify like elements, and in which:

DESCRIPTION OF THE PREFERRED EMBODIMENT

Figure 1:
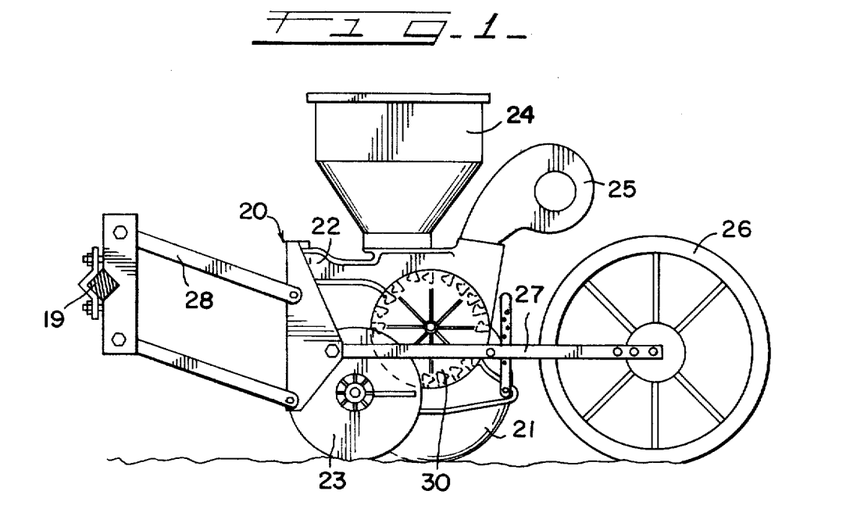
FIG. 1 is a side elevational view of a seed planter incorporating a seed metering apparatus constructed in accordance with the invention.

Referring to FIG. 1, the seed metering apparatus of the present invention is seen to be incorporated in a seed planter 20, which, with the exception of the metering system, may be conventional in design and construction. The seed planter 20 is in this instance a trailer-type planter, having a support tire 21 which is utilized to transport the planter when not planting and provides drive power to the planter when planting. Planter 20 is made up of a plurality of individual planter units arranged side-by-side to plant parallel rows. Each unit, as shown in FIG. 1, comprises a casting 22, a pair of furrow opening discs 23, a gravity feed seed hopper 24, a blower 25, a soil firming wheel 26, and a generally horizontal frame member 27. In use the casting is supported above the ground by soil firming wheel 26 and frame member 27, and the frame 20 is coupled by means of parallel linkage 28 to the planter main frame 19, which by means of a hitch (not shown) is coupled to the tractor (not shown) which draws the entire assembly along the ground.

Figures 2, 3:
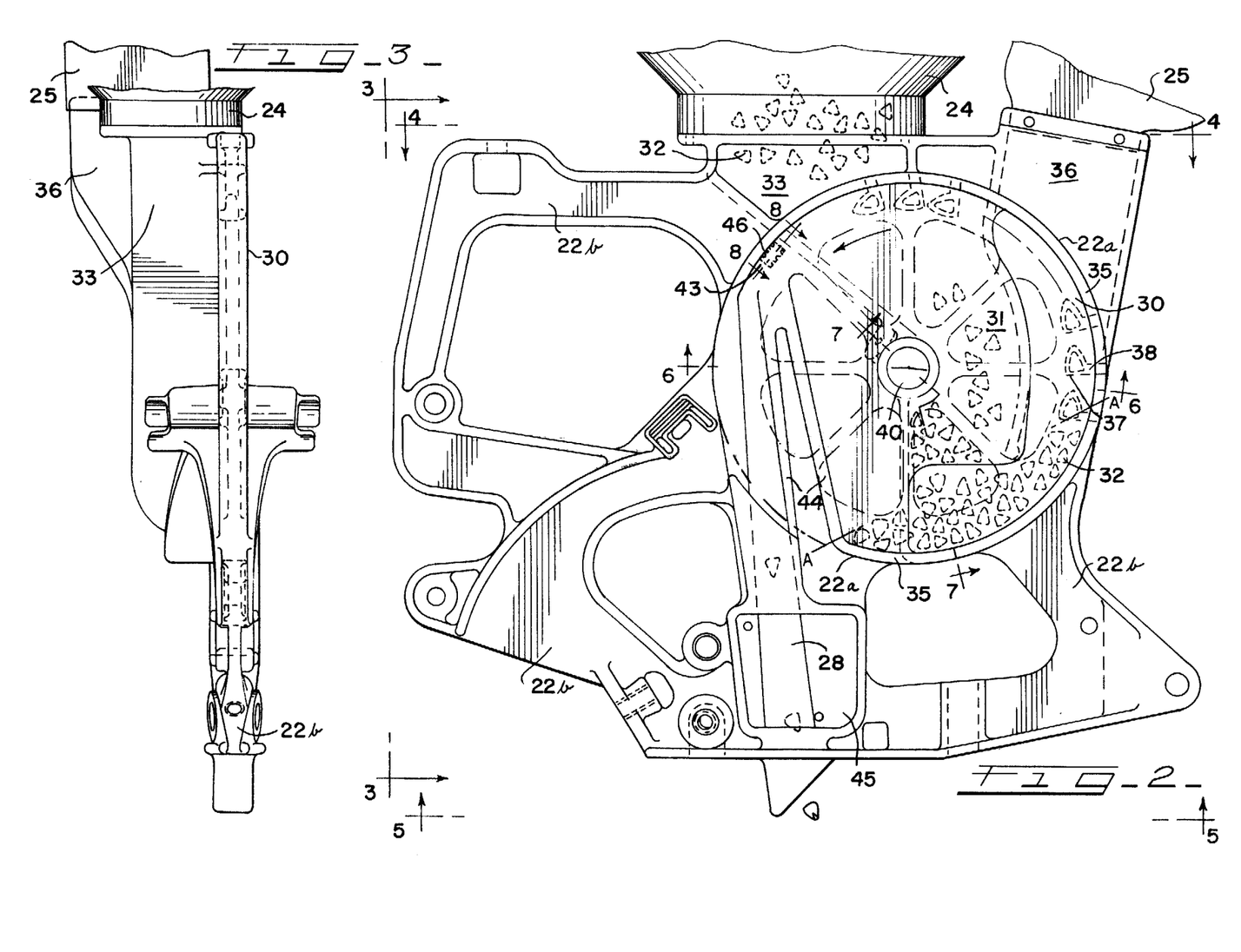
FIG. 2 is an enlarged front elevational view of the seed metering apparatus employed in the planter of FIG. 1.
FIG. 3 is a view of the seed metering apparatus of FIG. 2 taken along lines 3—3 of FIG. 2.

The gravity-feed hopper 24 is mounted on flanges provided at the top of casting 22, which incorporates a metering apparatus for dispensing seeds from the hopper 24 at a controlled rate into an underlying seed chute 28 (FIG. 3). This drop chute conveys the seeds to a furrow previously prepared by the double-disc assembly 23 provided at the front of the planter. The soil firming wheel 26 at the rear of the planter closes and firms the soil around the seeds in the furrow. The seed metering apparatus includes a disc-shaped metering member 30 which will be seen to provide, in conjunction with the electrically driven blower 25 which provides air pressure to a chamber 31 (FIGS. 2, 6 and 7) formed within housing 15, means for controlling the distance between seed drops in each row.

Figure 4:
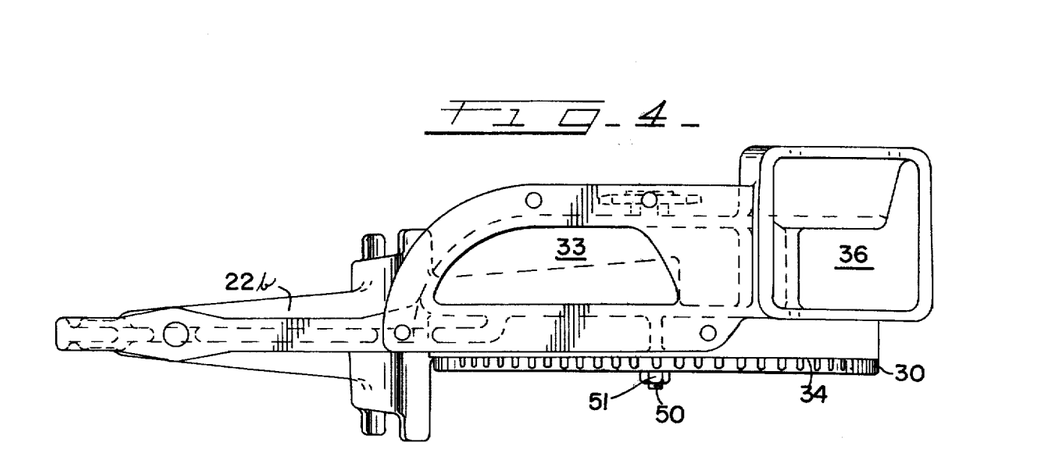
FIG. 4 is a view of the seed metering apparatus of FIG. 2 taken along lines 4—4 of FIG. 2.
Figure 5:
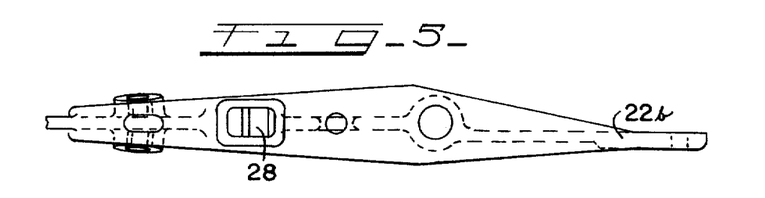
FIG. 5 is a view of the seed metering apparatus of FIG. 2 taken along lines 5—5 of FIG. 2.

Referring now to FIG. 2, a portion 22a of casting 22, which may be molded of metal or other suitable material, functions as a housing for the seed metering apparatus of the planter. This housing defines an internal chamber 31 into which seeds 32 are gravity fed from hopper 24 by way of a feed chute 33, which may be an integral part of the casting 22 as shown, or a separate element suitably attached thereto. Chamber 31 is provided with a generally annular opening 34 (FIG. 4) having a flat marginal surface 35 (FIG. 2) disposed in a single plane about its periphery, and is formed with two slightly different radii, for reasons which will be covered presently. Air under pressure is introduced into chamber 31 by way of an air duct 36 which communicates with the electrically driven blower 25. Casting 22 may incorporate necessary support brackets 22b having mounting holes and flanges for attachment to hopper 24, blower 25, frame 27, and linkage 28, the casting serving as the primary support member for these elements.

The metering of seeds from hopper 24 is accomplished by means of the disc-shaped metering member 30, which has a plurality of equi-spaced seed-receiving pockets 37 about its periphery. Each of these pockets is equipped with a passageway 38 extending from the pockets to the exterior of the housing for the purpose of creating a pressure differential on individual seeds 32 contained within the pockets.

The passageways 38 are formed within channels which extend radially from each pocket, the channels being closed by the marginal surface 35 provided on casting 22. Opening 34 is preferably formed with two slightly different radii, so that as disc 30 rotates the effective length of the passageways 38 is varied, and the position which the seeds 32 occupy when seated in pockets 37 periodically changes. This slight agitation or unsettling of the seeds as disc 30 spins helps to prevent extra seeds, i.e. a greater number of seeds than intended, from being retained in the pockets. The seed metering disc 30 is proportioned to overlie opening 34 so as to form at least a partial pneumatic seal over chamber 31, the passageways 38 associated with each pocket 37 on the disc 30 adjacent margin 35 providing at least a partial exhaust path to atmosphere for the pressurized air within chamber 31. The seed metering disc 30 is secured on a shaft 40, the latter shaft being journaled through a bearing sleeve 41 (FIG. 6) in casting 22 and carrying a sprocket 42 (FIG. 7) on its other side to facilitate coupling in driven relationship to the support wheel 21 of the planter by conventional chain drive means.

Drop chute 28 extends tangentially from the disc-shaped seed metering member 30 downwardly toward the furrow to be planted. The purpose of drop chute 28, as will be seen presently, is to direct or guide seeds after they have fallen from the pockets 37 provided or guide seeds after they have fallen from the pockets 37 provided in the seed metering wheel 30 into the furrow, and to this end the chute may be forwardly or rearwardly inclined, or may be curvilinear in appropriate applications. To cause the seeds to drop when the pockets pass over drop chute 28, a compartment 43 (FIG. 2) may be formed at the upper end of drop chute 28 in the arcuate path followed by pockets 37 as metering member 30 rotates. This compartment, as shown in FIG. 2, is integrally formed in casting 22 by baffles 44 formed by inwardly-extending extensions of the walls of chamber 31. The space between the baffles 44 pneumatically isolates the compartment 43 from the pressurized chamber 31, reducing the air pressure exerted on the seeds contained in pockets 37 therein to allow the seeds to drop into the underlying portion of the chute 28. The baffles 44, being in the form of a double wall, increase the pneumatic isolation provided compartment 43, and provide additional structural strength to casting 22. Casting 22 is also provided with a compartment 45 disposed medially in drop chute 28 for accommodating means for detecting the presence of seeds in the drop chute. By provision of a suitable detector and electronic circuitry therein, it is possible to automatically warn the operator should the planter become inoperative or run out of seeds, preventing subsequent loss of crops and/or wasted time.

The seed metering member 30 may be molded of a high-impact flexible plastic material, and is perferably transparent so as to allow the operator to visually confirm the presence of seeds in the pockets and the availability of an adequate supply of seeds. The metering disc may be molded, as by being formed slightly outwardly concave, so that when installed on shaft 40 its circumferential margin will be caused to bear down on the marginal surface 35 of the annular opening 34. This provides a more positive pressure seal and compensates for normal manufacturing tolerances in the dimensions of the disc 30 and housing 22a. In operation, this metering member turns counterclockwise (as viewed in FIG. 2) so that the individual seed pockets 37 are each first exposed to the seeds accumulated in chamber 31, and then to compartment 43. When the pockets 37 pass a valve or gate member 46 the pockets are no longer in the pressurized air environment of chamber 31. As a result, the seeds 32 carried by the pockets drop into chute 28 and thence into the planting furrow.

Figure 6:
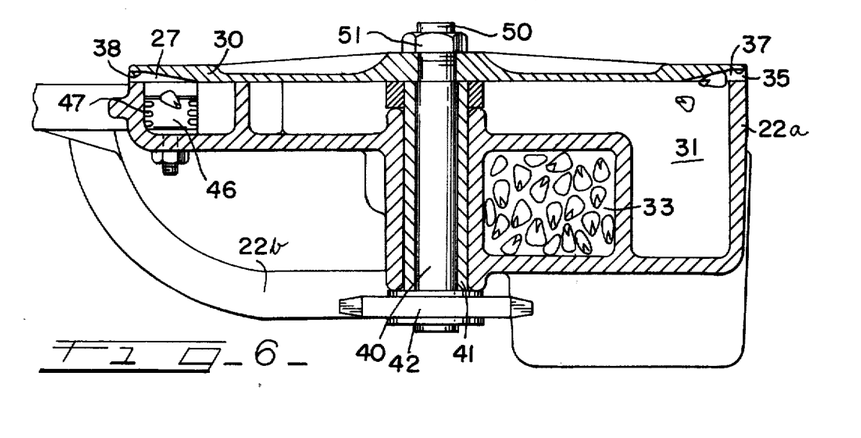
FIG. 6 is a cross-sectional view taken along lines 6—6 of FIG. 2.
Figure 7:
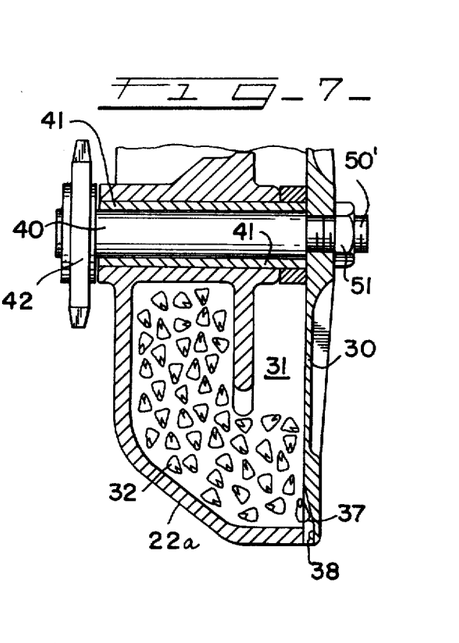
FIG. 7 is a fragmentary cross-sectional view taken along lines 7—7 of FIG. 2.
Figure 8:
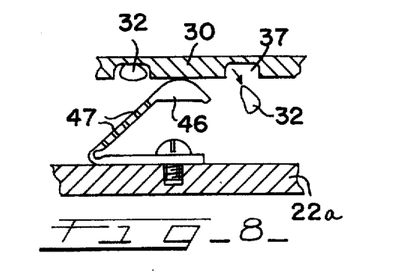
FIG. 8 is an enlarged cross-sectional view taken along lines 8—8 of FIG. 2.

The pressure gate member 46, as shown in FIGS. 2, 6 and 8, is mounted between chamber 31 and compartment 43 along the path taken by the pockets 37 to obtain controlled pneumatic isolation between the two areas. The gate member 46 is preferably flexible, and is disposed to resiliently bear against the inside surface of the metering disc 30 to remove any undesired excess seeds which may be attached to the pocket prior to entry into compartment 43. A plurality of serrations or apertures 47 (FIGS. 6 and 8) may be provided to admit a controlled amount of pressurized air into compartment 43 and drop chute 28 to clean these elements and to obtain a more positive and controlled seed flow to the furrow.

Figures 9, 11:
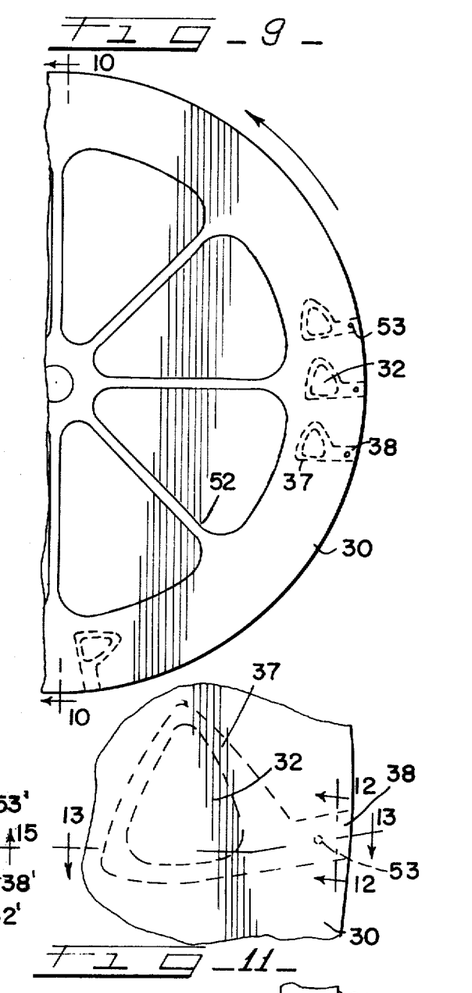
FIG. 9 is a fragmentary enlarged side elevational view of the seed metering disc of the invention showing seed-receiving pockets suitable for planting kernels of corn or similar types of seeds.
FIG. 11 is an enlarged view of one of the seed-receiving pockets disposed about the periphery of the seed metering disc of FIG. 9.
Figure 10:
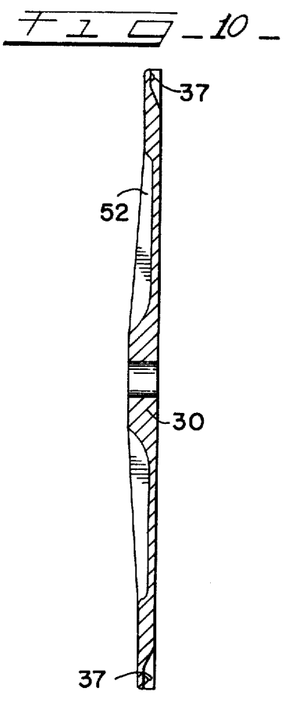
FIG. 10 is a cross-sectional view taken along lines 10—10 of FIG. 9.

The seed metering disc 30 is mounted on shaft 40 by means of a threaded extension 50 (FIG. 6) to provide on the shaft and a hex nut 51 tightened down against the metering disc. Shaft 40 may be keyed to disc 30 to further secure positive rotation. Member 30, as shown in FIGS. 9 and 10, is preferably provided with radially extending ribs 52 which increase the rigidity of the disc without unnecessarily increasing its size, weight, and cost. In FIGS. 9–13 a plurality of pockets 37 are shown disposed about the periphery of the metring disc 30. In this instance these pockets are shaped and dimensioned to receive a single seed or kernel 32 of corn, although other types of suitably sized seeds, including soybean seeds, cotton seeds, Spanish peanuts, red beans and other types of beans may be planted with good results. The shape of each pocket 37 is generally that of an equilateral triangle, and the trailing edge of the pocket is inclined slightly from true radial alignment with disc 30. The bottom of the pockets is inclined with its deeper dimensions adjacent passageways 38. The seed or kernel of corn 32, when urged into the pocket by the pressurized atmosphere within chamber 31, tends to lie flat against member 30, and the incidence of multiple kernels within a single pocket is substantially minimized.

Figure 12:
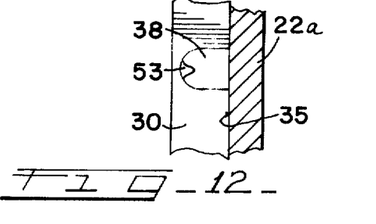
FIG. 12 is a view of the seed-receiving pocket of FIG. 11 taken along lines 12—12 of FIG. 10.
Figure 13:
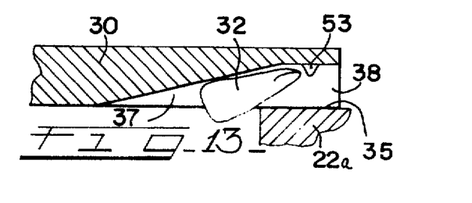
FIG. 13 is a cross-sectional view of the seed-receiving pocket of FIG. 11 taken along lines 13—13 of FIG. 11.

Passageways 38, as shown in FIG. 12, are formed by channels molded into disc 30 between the outer extremes of pockets 37 and the outer edge of the metering disc, and the overlying margin 35 of housing 22a. Although this passageway is sized smaller than the normal size of the seeds to be planted, a detent-like abutment 53 may be provided at the bottom of the passageway to prevent very small seeds from escaping.

Figure 14:
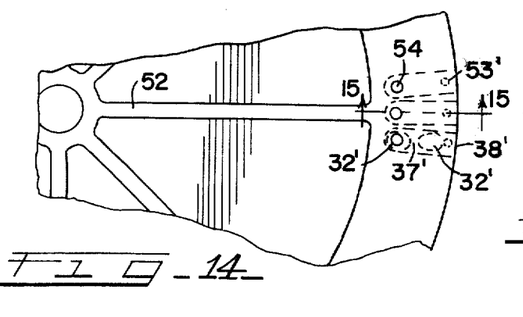
FIG. 14 is a fragmentary side elevational view of the seed metering disc of the invention provided with seed receiving pockets suitable for planting soybeans.
Figure 15:
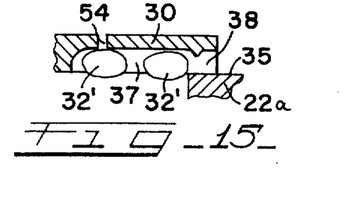
FIG. 15 is a cross-sectional view taken along lines 15—15 of FIG. 14.

It will be appreciated that the disc-shaped metering member 30 can be removed by the operator and that other discs having other types and shapes of pockets 37 can be provided for planting other types of seeds. For instance, and with reference to FIGS. 14 and 15, a pocket 37' in the form of an elongated channel may be provided for planting crops such as soybeans. In this case the seeds 32 are planted relatively close together and the slot is sufficiently elongated to accommodate two spaced bean seeds 32'. To securely hold two seeds in position it is necessary to provide an additional passageway in the form of an aperture 54 opening to the exterior of the seed disc 30. This allows sufficient air to escape to create an adequate pressure differential to hold a bean seed at the innermost position of pocket 37'. A second bean seed 32' is held at the outermost portion of pocket 37'. As in the case of the corn kernel seed pocket 37, a detent 53' is provided in the aforementioned passageway to prevent undersized seeds from exiting therethrough. In operation, the two seeds leave the pocket 32' at a slight time interval, resulting in a desired small spacing between the seeds when deposited in the furrow.

Figure 16:
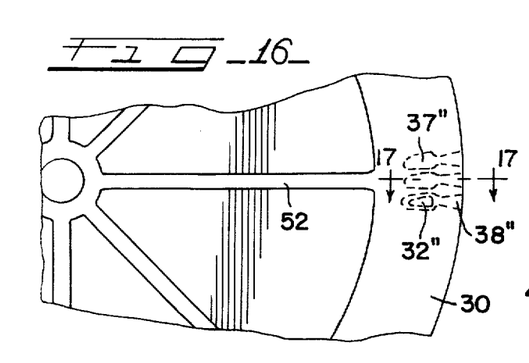
FIG. 16 is a fragmented side elevational view of the seed metering disc of the invention provided with seed receiving pockets suitable for planting sugar beet seeds.
Figure 17:
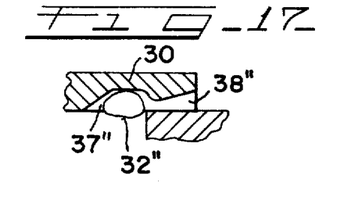
FIG. 17 is a cross-sectional view taken along lines 17—17 of FIG. 16.

A seed metering disc for planting small seeds such as sugar beets or sorghum is shown in FIGS. 16 and 17. In this instance the pockets 37'' are shaped and dimensioned to dispense a single seed 32''. Each pocket is oval-shaped and necks down to a passageway 38'' of reduced dimensions which expands as it extends radially to the circumference of the metering disc. As shown in FIG. 17, the pocket 37'' has sufficient depth to securely retain the seed 32'' and increases in depth as it extends radially outward to form passageway 38''. While seed metering discs having pockets shaped for the particular type of seed being planted will normally be used for optimum performance, it will be appreciated that should the particular metering disc not be available for a specific seed type it may be possible to use another type of disc to accomplish the planting.

In operation, a suitable metering disc 30 is selected for the crop to be planted. This disc is installed on shaft 40 by tightening hex nut 51 over the threaded end 50 of the shaft. A quantity of the seed 32 to be planted is next loaded into the gravity-feed hopper 24 so that the seed may drop through the seed feed chute 33 into chamber 31. When it is desired to commence planting, the blower 25 is energized by means of an electric switch located on the tractor and chamber 31 is pressurized through duct 36. The flow of air into chamber 31 has the effect of retaining the seeds 32 within the chamber at a predetermined contour as indicated at line A—A (FIG. 2). As the planter 20 is pulled along the ground by the tractor, a furrow is opened immediately ahead of the planter by the two-disc assembly 23. At the same time, the seed metering disc 30 is caused to rotate by means of a chain-belt drive or other suitable means (not shown) operatively coupling it to the support wheel 21 of the planter. Thus, the wheel rotates at a speed proportional to that of the planter, hence assuring a uniform distribution of the seeds within the furrow.

As the metering disc 30 rotates, the pockets 37 provided on its inside surface along its periphery are passed through the seeds 32 collected at the bottom of chamber 31. At this point each pocket 37 receives one or more of the seeds or kernels 32 and carries it upwardly as it rotates in a predefined arcuate path clear of the seeds and counterclockwise (as viewed in FIG. 2) toward compartment 43. The seed is retained within its pocket 37 at this time by reason of the pressurized atmosphere existing within chamber 31 and the pressure differential generated across the seed as the air exits through the passageway 38 adjacent that pocket. Extra seeds, i.e. seeds in excess of the number intended for the pocket, normally drop off as the pockets reach the top portion of their arcuate path.

During each revolution the metering disc 30 rotates each pocket 37 from chamber 31 to compartment 43. In practice, the pressure reducing effect of baffles 44 is sufficient of itself to cause the seeds to drop, notwithstanding the effects of pressure gate 46. However, pressure gate 46 is provided to make this release more positive, and to remove extra seeds which may not have fallen free from the pocket by that point. To this end, the pressure gate 46 is resilient so as to flex away from seeds properly seated in the pockets, but sufficiently stiff to remove any non-seated seeds.

By making the dimensions of chute 28 small and by providing a controlled air flow through pressure gate 46, bouncing of the seed with chute 28 as it descends to the furrow is minimized for more accurate planting and less chance of damage to the seed. As the seed 32 falls through drop chute 28 it passes through compartment 45, wherein there may be provided, if desired, suitable detection circuitry for ascertaining the passage of seeds, and hence for monitoring the successful operation of the planter.

The seeds are deposited by drop chute 28 in the previously opened furrow. After they have released their seeds, the pockets 37 continue counterclockwise until they again enter chamber 31 wherein another kernel or seed 32 is picked up.

By reason of the continuous operating cycle, the unique shape of the seed-receiving pockets, and the use of a pressurized atmosphere, the metering apparatus of the present invention may be operated at a relatively high speed with great accuracy. A sufficient amount of air escapes through the passageways 38 associated with each pocket 37 and through the interface between metering disc 30 and the marginal flange 35 provided on casting 22 about opening 34, to, in effect, form an air bearing between the two elements. This has the effect of reducing friction and reducing wear of the metering disc. Furthermore, the constant flow of air through the passageways 38 also has the effect of wiping the marginal surface 35 of casting 22 to prevent dust buildup and to purge chips or broken seeds from the pockets 37. The shape of the pockets 37 is such as to position the seeds 32 at the outside extreme of the metering disc 30 wherein the seeds are accelerated by the rotation of the disc so that lower air pressure is required to hold the seeds 32 within the pockets 37. The shape of the pockets 37 minimizes the likelihood of occupation of the pocket by more than the desired number of seeds or kernels of corn.

In practice, a plurality of planter units such as that heretofore shown and described in FIGS. 1–8 will normally be provided and arranged to operate in parallel so that multiple parallel furrows or rows can be planted with each pass of the planter. With this arrangement the provision of separate blowers 25 for each planter unit, as contemplated by the present invention, is particularly advantageous, since selected ones of the planter units may be activated or disabled by the operator as desired by not switching on, or switching off, the blower motor associated with that unit. This is particularly advantageous when planting near the end of a field wherein less than the number of rows the planter is capable of planting remain to be planted. Placing the air source close to the metering apparatus also has the advantage of reducing losses of air pressure in the system, leading to lower total energy requirements. Furthermore, while the invention has been shown in connection with a trailer-type unit, it will be appreciated that it can be utilized in connection with a tool-bar type unit wherein no support wheels 21 are provided and frame 27 is coupled to and supported by the tractor. In this case, driving power for metering disc 30 would be obtained from the soil firming wheel. Also, the double-disc type furrow opening assembly 23 could be a runner or plough type with the same result.

The provision of the spaced baffles 44 between drop chute 28 and the pressurized chamber 31 prevents the air pressure in chamber 31 from exhausting through drop chute 28. This not only conserves the pressure, but also minimizes bouncing of the seeds within the chute 28 due to air turbulence from excessive air escaping, which could result in non-uniform distribution of the seeds within the furrow. Instead, a controlled passage of air through drop chute 28 is obtained by provision of apertures 47 along the margins of gate 46 for improved reliability and control.

It will be appreciated that by changing the relative sizes of the sprocket drive provided for the metering disc 30, as well as the number of pockets 37 provided about the periphery of the disc, it is possible to plant seeds with a wide variety of perdetermined spacings. The disc may be fabricated of a low-cost molded high-impact transparent plastic such as polycarbonate resin (e.g. General Electric LEXAN). The low cost of the metering discs makes it practical for the operator to have the desired number of discs on hand to accommodate various types of seeds, and the transparency of the disc material allows the operator to visually ascertain the operation of the planter.

While the particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a seed planter for depositing seeds from a hopper into an underlying furrow at regular intervals, a seed metering apparatus, comprising, in combination:
   a housing defining a chamber having an opening with margins lying in a single plane;
   means comprising a drop chute for discharging seeds into said furrow;
   gravity feed means for conveying seeds from said hopper to said chamber;
   a disc shaped seed metering member having a flat inwardly-facing peripheral portion overlying said margins of said opening and having a plurality of pockets each dimensioned to receive a one or more of said seeds, said metering member being rotatably mounted so as to bring each of said pockets sequentially in communication with said chamber and said drop chute, and each of said pockets being provided with a pressure-relief passageway communicating to the outside of said housing;
   means for supplying pressurized air to said chamber to urge said seeds into said pockets;
   means for at least substantially isolating said pockets from said pressurized air while said pockets are in communication with said drop chute to allow the seeds in said pockets to fall into said drop chute; and
   means for rotating said metering member as said seed planter moves along said furrow.

2. A seed metering apparatus for a seed planter as defined in claim 1 wherein said seed-receiving pockets are contained in said peripheral portion of said disc-shaped metering member.

3. A seed metering apparatus for a seed planter as defined in claim 1 wherein said pressure-relief passageways extend radially across said peripheral portion of said disc-shaped metering member.

4. A seed metering apparatus for a seed planter as defined in claim 2 wherein said disc-shaped metering member is operatively engaged to said housing along said margins of said opening, said pressurized air serving to reduce the friction therebetween.

5. A seed metering apparatus for a seed planter as defined in claim 1 wherein said seed metering member is transparent.

6. In a seed planter, improved means for feeding seeds from a gravity discharge seed supply hopper into chute means for discharging seeds into the ground, said improved feeding means comprising, in combination:
   a housing having an opening at least a portion of the outer margin of which is defined by an arcuate surface lying in a plane, and having a seed-receiving portion wherein seeds collect in gravity-fed communication with said seed supply hopper and with said opening; and having a seed-discharging portion in gravity-discharge communication with said chute means;
   a rotatable cover for said housing opening having an annular surface with a curvature at least approximately equal to the curvature of said arcuate surface and lying in a single plane, said cover having a plurality of arcuately arranged seed-receiving pockets opening into said annular surface, said pockets sequentially coming into communication with said seed-receiving and said seed-discharging portions of said housing as said cover rotates, and means including a plurality of pressure-relief passageways associated with respective ones of said seed-receiving pockets for enabling air to escape from said pockets to outside said housing;
   means for rotatably mounting said cover whereby said annular surface thereof continuously moves over said arcuate surface in juxtaposed relation thereto;
   means for rotating said cover operatively connected therewith;
   mean for producing sufficient pneumatic pressure within said housing whereby the flow of air escaping through said pressure-relief passageways assists in holding seeds within said pockets as said cover rotates; and
   means for at least substantially shielding said seed pockets from said air flow as said pockets pass said seed-discharging portion whereby seeds fall from said pockets into said chute means.

7. In a seed planter, improved means for feeding seeds from a gravity discharge seed supply hopper into chute means for discharging seeds onto the ground, said improved feeding means comprising, in combination:
   a housing having an opening at least a portion of the outer margin of which is defined by an arcuate surface lying in a plane, and having a seed-receiving portion wherein seeds collect in gravity-fed communication with said seed supply hopper and with said opening; and having a seed-discharging portion in gravity-discharge communication with said chute means;
   a rotatable cover for said housing opening having an annular surface with a curvature at least approximately equal to the curvature of said arcuate surface and lying in a single plane, said cover having a plurality of arcuately arranged seed-receiving pockets opening into said annular surface and in seed pick up communication with said seed-receiving portion of said housing as said cover rotates;

means for rotatably mounting said cover whereby said annular surface thereof continuously moves over said arcuate surface in juxtaposed relation thereto;

means for rotating said cover operatively connected therewith;

means for producing sufficient pneumatic pressure within said housing whereby the flow of air escaping between said annular and arcuate surfaces holds seeds within said pockets as said cover rotates; and means for at least substantially shielding said seed pockets from said air flow as said pockets pass said seed-discharging portion whereby seeds fall from said pockets into said chute means.

8. Improved feeding means for a seed planter as defined in claim 7 wherein said seeds when received in said pockets bear against said margins of said opening, and wherein said opening is formed with at least two different radii to cause said seeds to be repositioned within said pockets as said metering member rotates.

9. Improved feeding means for a seed planter as defined in claim 7 wherein said rotatable cover is flexible and dimensioned such that its circumferential margin bears against said arcuate surface to form an improved pressure seal therewith.

10. Improved feeding means for a seed planter as defined in claim 7 wherein each of said seed-receiving pockets includes a pressure-relief passageway communicating with the outside of said housing.

11. Improved feeding means for a seed planter as defined in claim 10 wherein said passageways extend across said annular surface substantially radially to said cover.

12. Improved feeding means for a seed planter as defined in claim 6 wherein said seeds when received in said pockets bear against said margins of said opening, and wherein said opening is formed with at least two different radii to cause said seeds to be repositioned within said pockets as said metering member rotates.

13. Improved feeding means for a seed planter as defined in claim 7 wherein said means for shielding said seed pockets includes a pressure gate disposed along the arcuate surface of said housing which resiliently bears against the inside surface of said cover of dislodge excess seeds from said seed pockets.

14. Improved feeding means for a seed planter as defined in claim 7 wherein said rotatable cover is removable from said housing to enable other covers having differently sized or shaped pockets to be utilized in planting differently sized or shaped seeds.

15. Improved feeding means for a seed planter as defined in claim 6 wherein said rotatable cover is flexible and dimensioned such that its circumferential margin bears against said arcuate surface to form an improved pressure seal therewith.

16. Improved feeding means for a seed planter as defined in claim 6 wherein said pressure-relief passageways extend across said annular surface substantially radially to said cover.

17. Improved feeding means for a seed planter as defined in claim 6 wherein said cover is transparent.

18. A seed metering member for use in conjunction with a seed planter of the type having a housing having an opening at least a portion of the outer margin of which is defined by an arcuate surface lying in a plane, and having a seed-receiving portion wherein seeds collect, and a seed-discharging portion from which seeds are discharged;

support means for rotatably supporting a seed metering member in juxtaposed parallel-plane relationship to said arcuate surface;

means for rotating said seed metering member;

means for producing pneumatic pressure within said housing; and means for at least partially isolating said seed-discharging portion from said pneumatic pressure;

said seed metering member comprising a disc-shaped body portion having a center hub for mounting on said support means, and an annular surface with a curvature at least approximately equal to the curvature of said arcuate surface for operative engagement therewith and lying in a single plane, and a plurality of arcuately arranged seed-receiving pockets opening into said annular surface, said pockets sequentially communicating with said seed-receiving portion and with said seed-discharging portion of said housing as said seed metering member rotates, and at least one pressure-relief passageway associated with each of said seed-receiving pockets for enabling air to escape from said pockets to outside said housing to assist in holding seeds within said pockets as said seed metering member rotates.

19. A seed metering member as defined in claim 18 wherein said pressure-relief passageways extend across said annular surface substantially radially to said disc-shaped body portion.

20. A seed metering member as defined in claim 18 wherein said body portion is transparent.

21. A seed metering member as defined in claim 18 wherein at least a portion of the leading edge of each of said seed-receiving pockets is beveled to provide an inclined surface for assisting said pockets in receiving seeds from said seed-receiving portion of said housing.

22. A seed planter as defined in claim 1 wherein at least a portion of the leading edge of each of said seed-receiving pockets is beveled to provide an inclined surface for assisting said pockets in receiving seeds from said seed-receiving portion of said housing.

23. A seed planter as defined in claim 6 wherein at least a portion of the leading edge of each of said seed-receiving pockets is beveled to provide an inclined surface for assisting said pockets in receiving seeds from said seed-receiving portion of said housing.

* * * * *